United States Patent [19]
Viola

[11] Patent Number: 5,269,256
[45] Date of Patent: Dec. 14, 1993

[54] RING TOY FOR PETS

[76] Inventor: Charles A. Viola, 73 Earle Ave., Lynbrook, N.Y. 11563

[21] Appl. No.: 10,143

[22] Filed: Jan. 28, 1993

[51] Int. Cl.$^5$ ............... A01K 15/00; A63H 33/02; A63H 17/00
[52] U.S. Cl. ................ 119/707; 446/450; 446/465
[58] Field of Search ......... 119/29, 29.5; 446/450, 446/465, 412, 413; 482/74

[56] References Cited

U.S. PATENT DOCUMENTS

| | | | |
|---|---|---|---|
| D. 238,387 | 1/1976 | Rosenberg | D34/15 C |
| 726,789 | 4/1903 | Veideman | 446/450 |
| 1,604,381 | 10/1926 | Brown et al. | 446/413 |
| 3,198,173 | 8/1965 | Fisher | 119/29 |
| 3,441,001 | 4/1969 | Fisher | 119/29 |
| 4,020,589 | 5/1977 | Bravence et al. | 446/450 |
| 4,919,083 | 4/1990 | Axelrod | 119/29 |
| 5,207,420 | 5/1993 | Crawford et al. | 119/29 X |

*Primary Examiner*—Gene Mancene
*Assistant Examiner*—Thomas Price

[57] ABSTRACT

An amusement device (10) intended for use by cats and other pets, which can be easily caused to move in sliding, rolling, or somersaulting motions, or other lively motions, through manipulation with the paw. The device (10) comprises a circular ring formed of a circumferential band (11) which has a plurality of elevational undulations having bases (13) and peaks (12) and a number of upwardly projecting shapes (14) which can be easily gnawed or bitten by the pet and grasped by the mouth of the pet.

1 Claim, 3 Drawing Sheets

FIG. 1
FIG. 2
FIG. 3
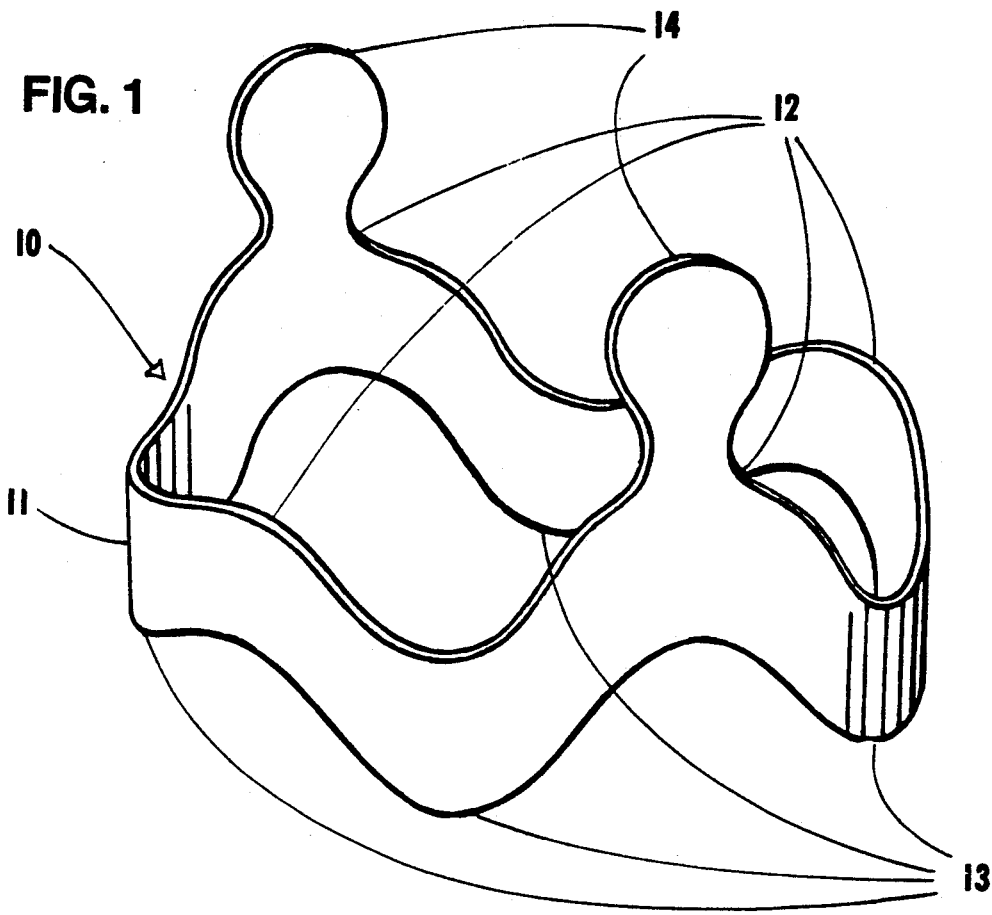
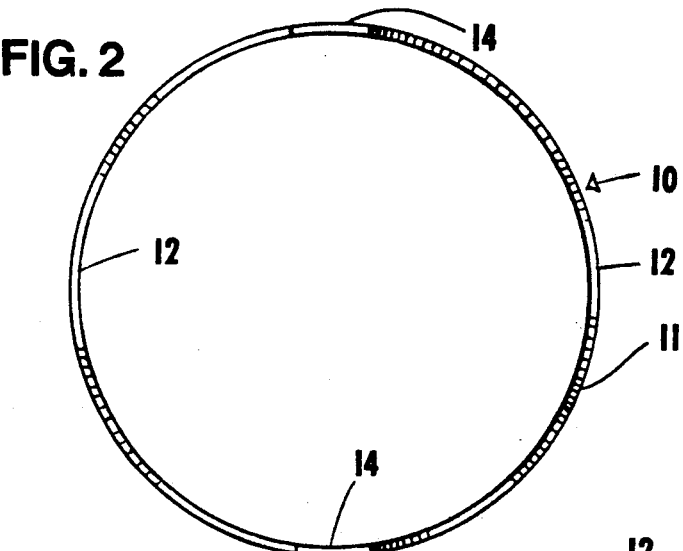
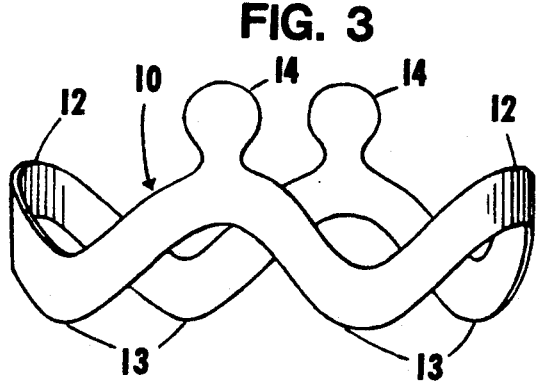

RING TOY FOR PETS

BACKGROUND

1. Field of the Invention

The invention disclosed herein is an improved toy for pets which relates most specifically to typical play patterns of cats with small inanimate objects. These play patterns include striking the object with the forepaws so as to set it in motion in a lively manner. After setting it in motion, cats commonly chase the object as they would chase small prey, scooping and batting it with their paws. Additionally, cats typically bite or gnaw upon small objects or carry them in their mouths. These activities provide amusement and excercise for the pet as well as entertainment for the pet owner.

21. Background

2. Description of Prior Art

Cats at play exhibit a high degree of inventiveness and dexterity, commonly making toys of small inanimate objects such as sticks, leaves, paper, or string. With these objects, they perform a variety of actions associated with hunting and capturing prey.

Typical behavior includes striking or pushing the object with the forepaws in order to impart to it a lively motion resembling that of a small animal. Once the object is moving, the cat chases and captures it, using its paws and mouth. Cats commonly bite the object and carry it around in their mouths. Such play activities not only provide amusement for the cat, but are believed to develop hunting skills, as well as provide an effective form of excercise.

In their selection of objects for play, cats usually show a preference for those which are small, lightweight, which can be bitten easily, carried easily, and can be caused to move in the most lively and varied manner.

The invention disclosed herein represents an improvement over prior amusement devices for cats in that it allows the cat to perform the widest range of natural actions in the easiest possible way.

Previous patented amusement devices for pets include U.S. Pat. No. 3,198,173 to Fisher and Des. 238,387 to Rosenberg. Of these devices, both are difficult for a cat to cause to move in a lively manner such as a rolling or somersaulting motion. Neither provides a projection upon which a cat can easily bite or gnaw.

While U.S. Pat. No. 4,919,083 to Axelrod includes a projecting ridge that can be grasped by the mouth of a dog, it is very difficult, if not impossible, for a cat to grasp with its mouth in order to carry the toy around. It is also very difficult for a cat to move the toy in a sliding, rolling, or somersaulting manner. When lying flat, it is difficult for a cat to insert its paw underneath to manipulate it with a scooping motion, one of the primary motions found in the play patterns of cats. The device of Axelrod is designed to be tossed in the air and retrieved, a play pattern not typically found in cats.

Of the few patented toys for pets, no one device allows the full range of typical play patterns of cats to be performed easily, if at all. The present invention allows the fullest range of typical cat play patterns to be performed with the least amount of effort.

OBJECTS AND ADVANTAGES

The invention described herein may be easily set into motion by a cat, using its forepaws in a variety of different natural movements. The bottom edge of the circumferential band is elevated in a number of places so that its contact with the surface upon which it rests is minimized. This minimal surface contact results in minimal friction when the device is caused by a cat to slide across a flat surface. Due to this minimal friction, the device slides quickly and far without much effort. Thus, the cat can bat the device about with its paw on a flat surface in the manner of a hockey puck gliding on ice, providing a high level of amusement and exercise.

The circumferential band has one or more upwardly projecting shapes which a cat can push with its forepaw in a sharp downward motion, thereby causing the device to flip or somersault in a lively manner. The liveliness of the somersaulting motion acts to excite the cat at play, enhancing its interest.

By pressing easily with its forepaws on said upwardly projecting shapes, the cat can tilt the device 90 degrees onto its side. Once on its side, the device can be easily made to roll like a wheel, when batted by the cat. If sharply batted, the rolling device will move at considerable speed, providing an exciting chase for the cat. While thus on its side, the undulations which are formed into the shape of the circumferential band provide a wide and stable base for the device so as to keep it from falling over as it rolls.

The device also incorporates numerous projecting shapes which the cat can easily bite or gnaw or can easily grasp in its month so as to carry the device.

DESCRIPTION OF THE DRAWINGS

FIG. 1 shows the invention in perspective

FIG. 2 shows a top view of the invention

FIG. 3 shows a side view of the invention

DESCRIPTION OF THE INVENTION

Figure 4:
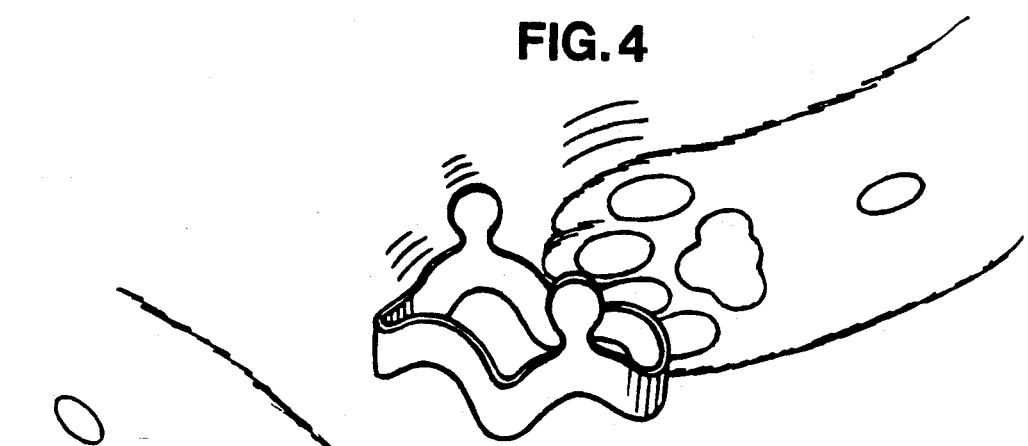
FIG. 4 shows the invention being moved by a cat in a sliding manner

As seen in FIG. 1, the present invention 10 comprises a circumerential band 11. Said circumferential band 11 is formed of a plurality of elevational undulations, each including a peak 12 at the highest point of elevation and base 13 at the lowest point of elevation.

Projecting upwards from the peaks 12 of the circumferential band 11 are a number of shapes 14 which are large enough to be manipulated by the forepaw of the cat, yet small enough to be easily bitten or grasped by the mouth of the cat. These shapes 14 serve the function of providing handles for the paw of the cat to manipulate and for the mouth of the cat to bite or grasp.

As can be seen in FIG. 2, the circumferential band 11 is circular in shape when viewed from the top. Said circular shape allows the invention 10 to roll easily when tilted onto its side.

Viewing the invention 10 from the side, as in FIG. 3, one can see how the device 10 rests upon the bases 13 of the undulations in the circumferential band 11. The remainder of the circumferential band 11 is elevated so as to minimize the amount of contact with the surface upon which the device 10 rests. By means of this minimized surface contact, the invention 10 may be moved in a sliding motion, by the paw of a cat, across a flat surface, such as a floor, with the least effort and greatest speed and distance. FIG. 4 illustrates the invention 10 being thus manipulated by the forepaw of a cat.

Figure 5:
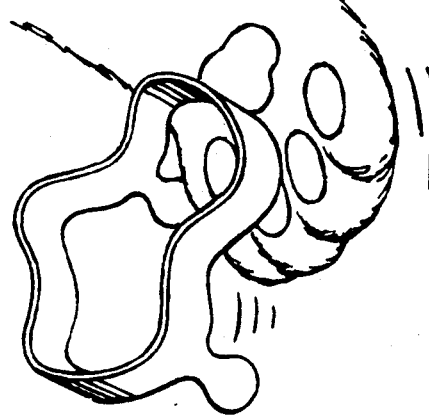
FIG. 5 shows the invention being moved by a cat with a scooping motion

The projecting shapes 14, in addition to providing a handle which can be manipulated by the paw of the cat or bitten by the mouth of the cat, serve the funtion or providing legs for balance in order to keep the device 10 standing at an angle, as seen in FIG. 5, so that it can be manipulated by the forepaw of a cat, with a scooping motion.

Figure 6:
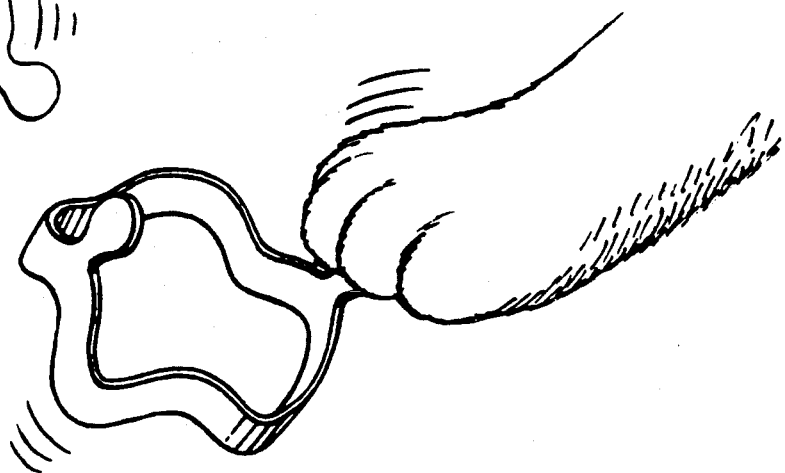
FIG. 6 shows the invention being struck on one of the upwardly projecting shapes, by the paw of a cat, in order to cause it to somersault

FIG. 6 shows the invention 10 being struck on one of the projecting shapes 14 in a downward motion. When thus manipulated, the device 10 will flip over or somersault in a very lively manner, which tends to excite the playing cat. The device 10 can be caused to somersault once or several times with a single blow, according to how sharply it is struck.

Figure 7:
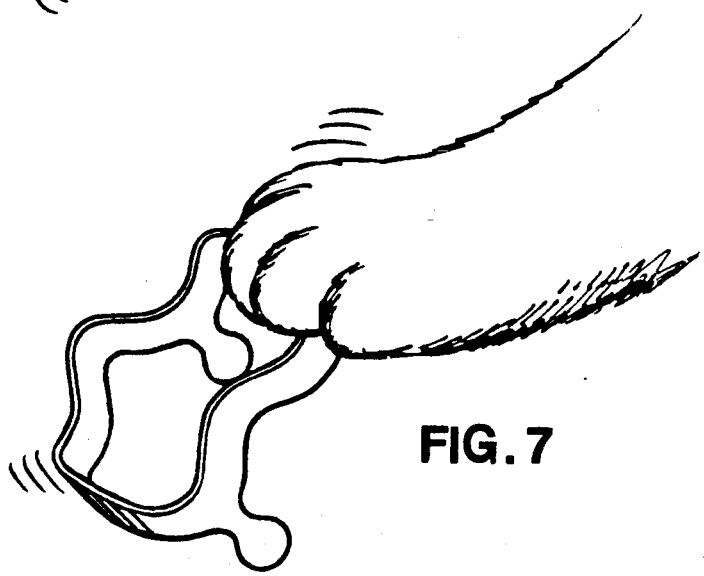
FIG. 7 shows the invention being struck on the circumferential band, by the paw of a cat, in order to cause it to somersault

FIG. 7 shows the device 10 in an inverted position. In this position, the device 10 can be made to somersault when struck sharply by the forepaw of the cat, in much the same way as described with reference to FIG. 6. Therefore., it can be seen that the invention 10 can easily be made to somersault whether it is inverted or upright, providing the maximum set of play posibilities for the cat.

Figure 8:
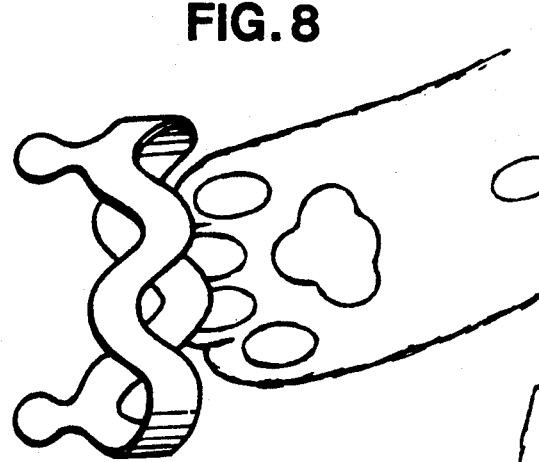
FIG. 8 shows the invention being rolled by a cat

FIG. 8 shows the device 10 being rolled by the forepaw of the cat. After tilting the device 10 onto its side, the cat can cause it to roll like a wheel. With a vigorous push, the cat can make the device 10 roll very quickly. The invention 10 remains stable and upright as it rolls due to the wide base provided by the undulations in the circumferential band 11.

Figure 9:
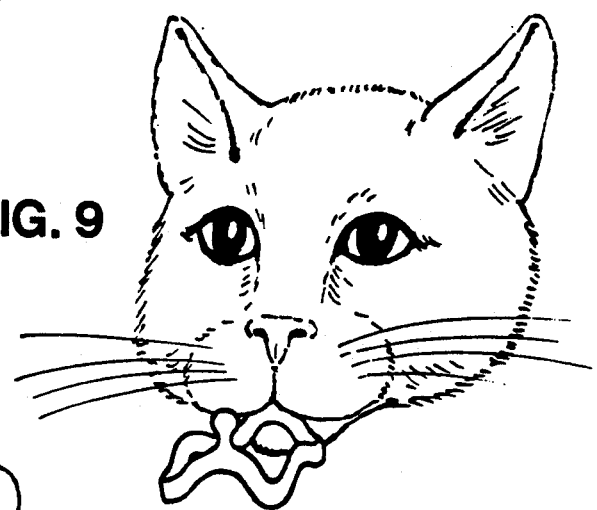
FIG. 9 shows the invention being grasped in the mouth of a cat

FIG. 9 shows the device 10 with one of the projecting shapes 14 being grasped in the mouth of the cat. In the manner illustrated, the cat can easily carry the device 10 around, a play pattern common to cats. The projecting shapes 14 may also be bitten or gnawed by the cat, during play. In a similar manner, the cat may also bite, gnaw, or grasp the peaks 12 or bases 13 of the undulations in the circumferential band 11.

Figure 10:
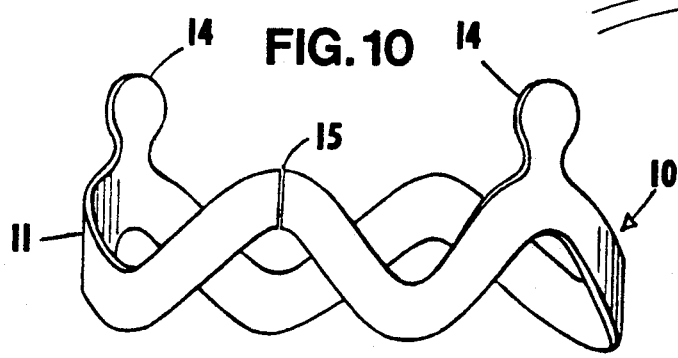
FIG. 10 shows an alternative embodiment of the invention with a discontinuity in the circumferential band
Figure 11:
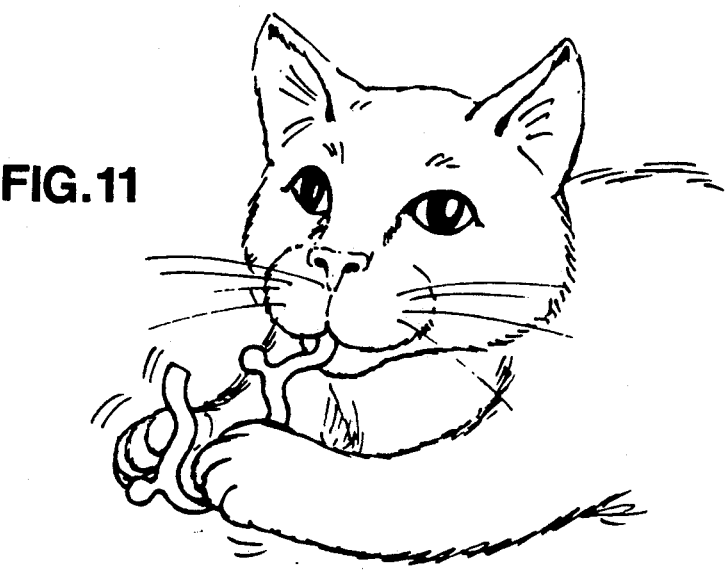
FIG. 11 shows the alternative embodiment of the invention being stretched and gnawed by a cat

FIG. 10 shows an alternative embodiment of the invention 10 with a discontinuity or slit 15 in the circumferential band 11. Because the circumferential band 11 is not connected in this embodiment, the device 10 can be stretched out, as shown in FIG. 11, during play to provide an enhanced experience of gnawing, which allows the use of the forepaws in grabbing and pulling the device 10. If the device 10 is made of a flexible material such as polyethylene, it will revert to its original shape after such stretching, so as to perform the other functions described herein.

Summary, Ramifications, and Scope

The present invention is an improved pet toy which can be utilized by a cat, or other playing pet, in a wider range of play patterns with greater ease and effectiveness than prior toys. When manipulated by the forepaw of a cat, the invention can be caused to slide with minimal friction, roll with stability so as to not fall over, and can be made to flip over in a lively somersaulting manner. It can also be moved about easily with a scooping motion of the forepaw. Additionally, the device provides projections which can be bitten, gnawed, or grasped in the mouth in order for the cat or pet to carry it around.

The specificities contained in the above description should not be construed as limitations on the scope of the invention, but rather as an exemplification of one preferred embodiment thereof. Many variations are possible.

For example, other embodiments of the present invention may be contemplated in which the number of undulations in the circumferential band are more or less than the number shown in the drawings above. Likewise, embodiments may be contemplated in which the number of projecting shapes are more or less than those shown. Accordingly, the scope of the invention should be determined not by the embodiments illustrated, but by the appended claim and legal equivalents.

While the invention is designed primarily for use by cats, other playing pets such as ferrets, parrots, or dogs could also use the device, as it is versatile enough to accommodate the play patterns of a wide variety of animals.

The invention can be made of any size that can be easily manipulated, bitten, and carried by the pet.

The invention can be made of any material which can be molded into the form described herein, preferably a lightweight, flexible, and structurally stable plastic such as polyethylene.

What is claimed is:

1. An amusement device intended for use by cats and other pets, said device comprising:
    (a) a circular ring formed of a circumferential band
    (b) said circumferential band having a plurality of elevational undulations
    (c) said circumferential band having one or more elevational projections which can be manipulated by the paw of the pet and grasped by the mouth of the pet.

* * * * *